United States Patent
Brown et al.

(10) Patent No.: US 12,007,855 B2
(45) Date of Patent: Jun. 11, 2024

(54) EFFICIENT TRANSPARENT ROLLBACK OF FILE SYSTEM CONSOLIDATION MIGRATIONS

(71) Applicant: Dell Products, L.P., Round Rock, TX (US)

(72) Inventors: Ronald Brown, Fife (GB); John Bankier, Glasgow (GB); Pascal Donette, Magny les Hameaux (FR); Francois Roche, Bailly (FR)

(73) Assignee: DELL PRODUCTS L.P., Round Rock, TX (US)

( * ) Notice: Subject to any disclaimer, the term of this patent is extended or adjusted under 35 U.S.C. 154(b) by 324 days.

(21) Appl. No.: 17/565,408

(22) Filed: Dec. 29, 2021

(65) Prior Publication Data

US 2023/0205646 A1 Jun. 29, 2023

(51) Int. Cl.
*G06F 11/14* (2006.01)
*G06F 16/11* (2019.01)

(52) U.S. Cl.
CPC ........ *G06F 11/1469* (2013.01); *G06F 16/116* (2019.01); *G06F 16/119* (2019.01); *G06F 2201/84* (2013.01)

(58) Field of Classification Search
None
See application file for complete search history.

(56) References Cited

U.S. PATENT DOCUMENTS

| | | |
|---|---|---|
| 5,991,753 A | 11/1999 | Wilde |
| 6,938,039 B1 | 8/2005 | Bober et al. |
| 7,653,699 B1 | 1/2010 | Colgrove et al. |
| 7,769,722 B1 * | 8/2010 | Bergant ................ G06F 16/125 |
| | | 707/681 |
| 7,958,097 B1 | 6/2011 | Tormasov et al. |
| 8,601,220 B1 | 12/2013 | Corbin et al. |
| 8,655,848 B1 | 2/2014 | Leverett et al. |
| 8,671,072 B1 | 3/2014 | Shah et al. |
| 9,223,791 B2 | 12/2015 | Whitehouse |

(Continued)

OTHER PUBLICATIONS

Office Action dated Aug. 15, 2023 for U.S. Appl. No. 17/538,363, 51 pages.

(Continued)

*Primary Examiner* — Eddy Cheung

(74) *Attorney, Agent, or Firm* — Amin, Turocy & Watson, LLP

(57) ABSTRACT

A system can perform a migration. The system can, in response to receiving a request to perform a file system operation on a destination file system, wherein the request identifies a first source file handle, direct, by a second computer and to a first computer, to perform the file system operation on a source file system with the first source file handle, to produce a second source file handle, convert the first and second source file handles to corresponding first and second components of a destination file handle, perform the file system operation on the destination file system with the first and second components of a destination file handle, respond to the client computer with the second source file handle. The system can re-assign a network address when rolling back the migration, wherein a client is configured to use the second source file handle with the source file system.

20 Claims, 10 Drawing Sheets

(56) References Cited

U.S. PATENT DOCUMENTS

| | | | |
|---|---|---|---|
| 9,305,071 | B1 | 4/2016 | Bono et al. |
| 9,323,758 | B1 | 4/2016 | Stacey et al. |
| 9,639,553 | B2 | 5/2017 | Hall et al. |
| 10,083,181 | B2 | 9/2018 | Chun |
| 10,430,389 | B1 | 10/2019 | Gupta et al. |
| 10,552,371 | B1 | 2/2020 | Liao et al. |
| 11,533,196 | B2 | 12/2022 | Cananzi |
| 11,546,288 | B2 | 1/2023 | Chander et al. |
| 2003/0158834 | A1 | 8/2003 | Sawdon et al. |
| 2003/0182313 | A1 | 9/2003 | Federwisch et al. |
| 2003/0182322 | A1 | 9/2003 | Manley et al. |
| 2003/0182325 | A1 | 9/2003 | Manley et al. |
| 2006/0129513 | A1 | 6/2006 | Nakatani et al. |
| 2007/0038689 | A1 | 2/2007 | Shinkai |
| 2007/0100980 | A1 | 5/2007 | Kataoka et al. |
| 2008/0172423 | A1 | 7/2008 | Shinkai et al. |
| 2009/0157690 | A1 | 6/2009 | Haswell |
| 2011/0016085 | A1 | 1/2011 | Kuo et al. |
| 2013/0218847 | A1 | 8/2013 | Saika |
| 2014/0019413 | A1 | 1/2014 | Braam et al. |
| 2014/0019425 | A1 | 1/2014 | Honami et al. |
| 2014/0108475 | A1 | 4/2014 | Yamada et al. |
| 2014/0188953 | A1 | 7/2014 | Lin et al. |
| 2015/0120792 | A1 | 4/2015 | Khandelwal et al. |
| 2015/0293699 | A1 | 10/2015 | Bromley et al. |
| 2016/0055224 | A1 | 2/2016 | Shetty et al. |
| 2016/0321295 | A1 | 11/2016 | Dalton |
| 2017/0075907 | A1* | 3/2017 | Goswami ............ G06F 11/0751 |
| 2017/0123937 | A1 | 5/2017 | Iwasaki et al. |
| 2017/0139932 | A1 | 5/2017 | Hasegawa et al. |
| 2017/0228248 | A1* | 8/2017 | Bala .................... G06F 11/1402 |
| 2018/0189311 | A1 | 7/2018 | Newhouse et al. |
| 2021/0089680 | A1 | 3/2021 | Gkoulalas-Divanis et al. |
| 2021/0303519 | A1 | 9/2021 | Periyagaram et al. |
| 2021/0374099 | A1 | 12/2021 | Raju et al. |
| 2022/0332178 | A1 | 10/2022 | Brown |
| 2023/0004535 | A1 | 1/2023 | Shaw et al. |
| 2023/0056217 | A1* | 2/2023 | Rathi .................. G06F 16/1844 |

OTHER PUBLICATIONS

Brown, et al. "Efficient Transparent Switchover of File System Consolidation Migrations" U.S. Appl. No. 17/538,363, filed Nov. 30, 2021, 54 pages.

Bankier, et al. "Inode Clash Resolution During File System Migration" U.S. Appl. No. 17/538,387, filed Nov. 30, 2021, 47 pages.

Office Action mailed Jan. 19, 2023 for U.S. Appl. No. 17/538,387, 39 pages.

Notice of Allowance mailed Jul. 28, 2023 for U.S. Appl. No. 17/538,387, 43 pages.

Notice of Allowance mailed Dec. 13, 2023 for U.S. Appl. No. 17/538,363, 21 pages.

* cited by examiner

300

```
┌─────────────────────┐
│     EFFICIENT       │
│    TRANSPARENT      │
│  ROLLBACK OF FILE   │
│ SYSTEM CONSOLIDATION│
│     MIGRATIONS      │
│   COMPONENT 310     │
└─────────────────────┘

┌─────────────────────┐
│   FILE HANDLE 302   │
│ ┌─────────────────┐ │
│ │ FILE SYSTEM ID 304│
│ └─────────────────┘ │
│ ┌─────────────────┐ │
│ │ INODE NUMBER 306│ │
│ └─────────────────┘ │
│ ┌─────────────────┐ │
│ │GENERATION NUMBER│ │
│ │       308       │ │
│ └─────────────────┘ │
└─────────────────────┘
```

FIG. 3

EFFICIENT TRANSPARENT ROLLBACK OF FILE SYSTEM CONSOLIDATION MIGRATIONS

BACKGROUND

File system migration can generally comprise transferring a computer file system from a source computer to a destination computer. Where the source computer is a server that provides file system access to a remote client computer, the destination computer can provide that file system access to the remote client computer after a file system migration occurs. File system rollback can generally comprise stopping a migration and reverting to accessing a source, where the source computer returns to providing the file system access, rather than the destination computer.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can perform a migration from a source file system on a first computer to a destination file system on a second computer, wherein performing the migration comprises re-assigning a network address from identifying the first computer to identifying the second computer. The system can, in response to receiving a request, issued by the client computer, to perform a file system operation on the destination file system, wherein the request identifies a first source file handle, direct, by the second computer and to the first computer, to perform the file system operation on the source file system with the first source file handle, to produce a second source file handle, convert the first source file handle to corresponding first components of a destination file handle, convert the second source file handle to corresponding second components of a destination file handle, perform the file system operation on the destination file system with the first components of a destination file handle and the second components of a destination file handle, and respond to the client computer with the second source file handle. The system can, in response to determining to roll back the migration, re-assign the network address from identifying the second computer to identifying the first computer, wherein the client computer is configured to use the second source file handle that was issued by the second computer in accessing resources of the source file system.

An example method can comprise performing, by a system comprising a processor, a migration from a source file system on a first computer to a destination file system on a second computer, wherein performing the migration comprises re-assigning a network address from identifying the first computer to identifying the second computer. The method can further comprise, in response to receiving, by the system, a request, issued by the client computer, to perform a file system operation on the destination file system, wherein the request identifies a first source file handle, directing, by the second computer and to the first computer, to perform the file system operation on the source file system with the first source file handle, to produce a second source file handle, converting the first source file handle to corresponding first components of a destination file handle, converting the second source file handle to corresponding second components of a destination file handle, performing the file system operation on the destination file system with the first components of a destination file handle and the second components of a destination file handle, and responding to the client computer with the second source file handle. The method can further comprise in response to determining to roll back the migration, re-assigning, by the system, the network address from identifying the second computer to identifying the first computer, wherein the client computer is configured to use the second source file handle that was issued by the second computer in accessing resources of the source file system.

An example non-transitory computer-readable medium can comprise instructions that, in response to execution, cause a system comprising a processor to perform operations. These operations can comprise performing a migration from a source file system on a first computer to a destination file system on a second computer, wherein performing the migration comprises re-assigning a network address from identifying the first computer to identifying the second computer. These operations can further comprise, in response to receiving a request, issued by the client computer, to perform a file system operation on the destination file system, wherein the request identifies a first source file handle, directing, by the second computer and to the first computer, to perform the file system operation on the source file system with the first source file handle, to produce a second source file handle, converting the first source file handle to corresponding first components of a destination file handle, converting the second source file handle to corresponding second components of a destination file handle, performing the file system operation on the destination file system with the first components of a destination file handle and the second components of a destination file handle, and responding to the client computer with the second source file handle. These operations can further comprise, in response to determining to roll back the migration, re-assigning the network address from identifying the second computer to identifying the first computer, wherein the client computer is configured to use the second source file handle that was issued by the second computer in accessing resources of the source file system.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 3 illustrates a system architecture of a file handle that can facilitate efficient transparent rollback of file system consolidation migrations, in accordance with an embodiment of this disclosure;

DETAILED DESCRIPTION

Overview

Figure 1:
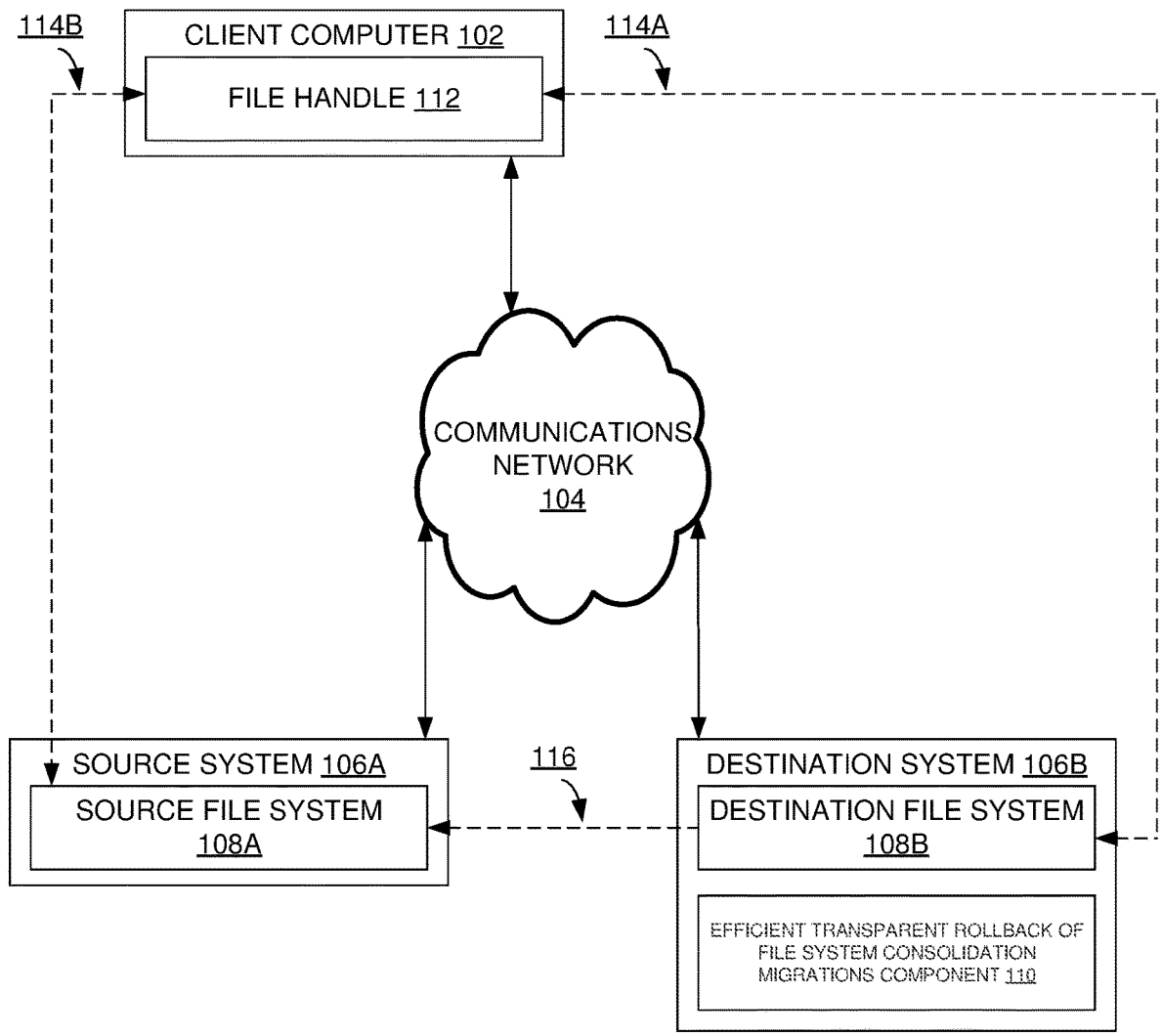
FIG. 1 illustrates an example system architecture that can facilitate efficient transparent rollback of file system consolidation migrations, in accordance with an embodiment of this disclosure.

While the examples described herein primarily relate to a network file system (NFS) file access protocol, it can be appreciated that the present techniques can be applied to other protocols that have suitable characteristics.

The present techniques can be implemented to facilitate transparent rollback of a file system migration, and processing reparenting operations across a migration boundary, where multiple source file systems have been migrated to one destination file system.

During a migration from a source computer to a destination computer, a network address associated with the source computer (and used by a client computer to access the source computer) can be re-assigned to be associated with the destination computer. File handles possessed by the client computer that were issued by the source file system (which can be referred to as source file handles) can be used on the destination file system. The destination file system can convert a source file handle into a corresponding file handle on the destination file system that addresses the same object (which can be referred to as a destination file handle).

While allowing for transparent rollback of the migration, the destination file system can issue client computers source file handles by generating a destination file handle, converting the destination file handle to a source file handle, and returning the source file handle to the client computer. A reason for this approach can be to facilitate a quick rollback. Where a component that facilitates transparent rollback is hosted on a destination computer but not a source computer, it can be that the source computer lacks a configuration to convert a destination file handle to a source file handle. By issuing clients source file handles, the destination computer can ensure that the client computer has file handles that are configured to be used with the source file system in case of rollback.

Then, data stored on the destination file system can be duplicated on the source file system. So, in case of a rollback, a network address can be re-assigned from identifying the destination computer and back to identifying the source computer, and the client computer has source file handles, so the rollback can occur without knowledge by the client (which can be referred to as a transparent rollback).

One approach to duplicating data on the destination and source file systems can be as follows. A client computer can contact the destination computer with a source file handle. The destination computer can convert the source file handle to a corresponding destination file handle and perform some preliminary functions, such as determining whether the operation comprises a reparenting operation across a migration boundary. The destination computer can contact the source computer to perform the operation on the source file system using the source file handle. The destination computer can also perform the operation on the destination file system using a destination file handle that is generated from the source file handle. Where the operation succeeds on both the source file system and the destination file system (so the two systems store the same data), the destination computer can send the client computer an indication that the operation was successful.

At a point in time, it can be determined to no longer allow for a rollback. At this point, the destination file system can begin issuing destination file handles to client computers.

A reparenting operation can be processed as follows. A reparenting operation can generally comprise moving a file system object from one location within a file system to another location. Where a destination file system comprises multiple migrated source file systems, a migration boundary can comprise a delineation between an area in the destination file system to which a first source file system has been migrated, and another area in the destination file system to which a second source file system has been migrated.

Reparenting across a migration boundary can be rejected because there is no equivalent operation for either source file system (where source file systems are kept in sync with a destination file system to facilitate rollback). A client computer can provide two source file handles as part of a reparenting operation (one for the current location of the object being reparented, and one for the new location). These source file handles can be converted to destination file handles by the destination file system. The destination file system can determine corresponding migration identifiers for each destination file handle, where a migration identifier indicates which migration the destination file handle corresponds to. Where the migration identifiers are equal, this can indicate that the reparenting operation occurs within a migration boundary, and can be carried out.

Where the migration identifiers differ, this can indicate that the reparenting operation crosses a migration boundary. The destination file system can reject the reparenting operation by sending an error to the client computer. In some examples, the client computer will reach to receiving this error by issuing commands to the destination file system to perform other commands that are equivalent to reparenting, such as copying the object to a new location and then deleting the object at the old location.

Similar techniques can be implemented to process creating hard links and soft links across a migration boundary.

Migrating a file system in-band can comprise an approach to consolidating multiple source file systems into a single destination file system. The present techniques can be implemented to provide an inode number management mechanism that facilitates consolidation migrations being performed in a manner that includes an efficient transparent rollback.

Client computers that use a NFS file access protocol to access files and directories within a file system that is stored on a file server can initially navigate to a particular file or directory using name based query requests that return file handle data structures. Once a file handle of a particular file or directory has been discovered, then the client computers can use the file handle for subsequent access of that file or directory.

A NFS protocol can consider file handles to be opaque data structures, though internally a file handle can comprise three components: a file system ID, an inode number, and a generation number.

A transparent switchover can be implemented as follows. When migrating a file system from a source file server to a different, destination file server, it is possible to arrange for client computers using a NFS protocol to continue using existing file handles from the source file server to access the file system on the destination file server after switchover, without disruption or taking additional action by the client computer. In some examples, this can be accomplished as follows:

1. The destination file server can take over a network address of the source file server. NFS protocol requests from client computers containing source file handles can then received on the destination file server.
2. The destination file server can use a file system ID component of the source file handle to determine which destination file system is being referred to.
3. The destination file server can use the source inode number to look up the equivalent entity (e.g., a corresponding file or directory) in the destination file system and the generation number to verify that it is the same version as expected.

A reparenting scenario can be as follows. It can be that two source file systems have been migrated to a destination file system. A client computer can request to reparent an object on the destination file system across a migration boundary—from part of the destination file system that stores a migration from a first source file system to part of the destination file system that stores a migration from a second source file system.

The destination file system can determine that a migration boundary is being crossed by looking at two destination file handles—if they point to destination inode number segments that store different migration IDs, then it can be determined that a boundary is crossed. If a boundary is crossed, then a "not same device" error can be returned to the client, which can manually copy the object in response.

In some examples, a reparenting operation with a NFSv3 protocol can be a RENAME operation, where a specific entity to be reparented is not specified directly, but rather a file handle of a "from directory" and a name of the entity are specified. Similarly, a destination can be specified in terms of a file handle of the "to directory" and a name within that directory. For example, a reparenting operation that reparents an object from one directory to another can include arguments for the directory file handle from which the object is being moved, the name of the object being moved, the directory file handle to which the object is being moved, and the name of the object after being moved.

In some examples, a client can provide source file handles, which are translated into destination file handles for a comparison to see if they have a same generation number.

A problem with reparenting an object across a migration boundary on a destination file system can be that this new location does not exist on the source file system. That is, a cross-migration boundary reparent operation can be valid in terms of a destination file system, but not in terms of a source file system, because it could involve reparenting the object to a location that does not exist on the source file system, and that would not be accessible after rollback.

Manually copying an object in a reparenting operation across a migration boundary can be implemented as follows. In some examples, as part of a migration switchover, a source server network address can be moved to destination server, and the source server can be assigned a new network address (in a rollback, the source server can be re-assigned its original network address). Source credentials can be useable on the destination to facilitate transparent switchover and rollback.

Where a client computer falls back to copying the data after receiving an error (e.g., a NFS XDEV "cross device" error), the client computer can create new objects at the new location on the source for each object being copied. Each create operation can be applied to the source file system first, and a source file handle for the new location can be returned to the client. The client computer can then manually copy the contents of each file or alternate stream by reading from the original location source file handle and writing to the new location source file handle. The client computer can delete the objects from the original source location after copying them. As used herein, "manually" copying can generally refer to the client computer performing certain operations. A manual copy in this context can be transparent to a user of the client computer, because it is handled by the client computer.

A transparent rollback can be implemented as follows. A rollback from a destination file system to a source file system can be implemented in case of an error, and can be facilitated by returning source file handles to a client computer. That is, transparent rollback can be facilitated by providing a client with source file handles, and translating source file handles used by the client to destination file handles to process on the destination file system. Then, in case of a rollback, a network address used by the client to access the destination file system can be switched to identify the source file system, and the client can continue using source file handles with the source file system.

In some examples, transparent rollback can be facilitated by a destination computer that hosts the destination file system, and a source computer that hosts a source file system does not host a component for translating destination file handles into source file handles. In such examples, by providing the client with source file handles, the client can continue to use these source file handles on the source file system.

Similar to a transparent switchover, client computers using a NFS protocol can rollback (or switch back) from a destination file server and to a source file server in a case where there is a migration problem. This can be performed without disruption to the client computer, and without the client computer taking an additional action. In some examples, this can be accomplished as follows:

1. The source file server can take back its original network address.

2. Changes made to the destination file system made after switchover can also have been synchronously made to the source file system.
3. New file handles returned to the client computer by the destination file server after switchover can be in a file handle format, where they comprise the source file system ID, source inode number, and source generation number.

An inode mapping table can be implemented as follows. According to some prior approaches, a mapping table can be used to map a combination of inode number and generation number from a source file system to an inode number and generation number of an equivalent entity on a destination file system (and vice versa).

Where one entity can be required per file system entity, each mapping table can be prohibitively large. Additionally, it can be difficult to manage, where a large mapping cable is able to be deleted only once clients are no longer using source file handles.

Inode preservation can be implemented as follows. Some in-band migration products can be implemented without a requirement for a mapping table, where in-band migration can preserve an inode number and generation number of an entity when migrating it. This approach can be referred to as "inode preservation."

However, inode preservation can have a problem where it can not be possible to consolidate multiple file systems from different source file servers into a single destination file system because of a possibilty that more than one source file can contain the same inode number.

The present techniques can facilitate an inode number mapping mechanism that allows a consolidation of multiple source file systems into a single destination file system without an expense of a per inode number mapping table. This consolidation can be performed in series (where a single source file system is migrated at a time) or in parallel (where all source file systems are migrated at the same time).

According to the present techniques, the source file system and destination file system inode spaces are split into one or more segments, and source file system inode number segments can be deterministically mapped to destination file system inode number segments (and vice versa). In some examples, the segments can be of a varying size, and a mapping from source to destination can be 1:1, 1:n, or n:1. This approach can facilitate source file handles being returned to clients for each source file system of a consolidation migration.

Inode number segments can be used to detect and reject an attempt by a client computer to re-parent a file or directory across a migration boundary. When such a situation is detected, a NFS XDEV "cross device" or SMB STATUS_NOT_SAME_DEVICE error can be returned to the client computer, and, in some examples, client computers that receive these errors can fall back to manually copying the data, which can ensure that the resulting data and associated file handles (for NFS clients) can also be usable on the source in the case of a rollback.

A migration boundary can represent a part of the destination file system that contains data from a single source file system. In reparenting an entity from one location within a single source file system to another location within the same source file system, all of the data can already be present in the source file system, and can be reparented in a single atomic operation sent to the source file server (where changes can be applied to the source first in case of rollback). However, when attempting to reparent an entity on the destination across a migration boundary (e.g. from one source file system to another source file system), it can be that the data is only present on the destination file server so there is not an atomic operation that can be sent to a second source file server to perform the reparent operation. In such cases, this can be addressed by returning a "not same device" error.

In some implementations, a client computer reacts to a "not same device" error by copying the data rather than reparenting it, which can be transparent to the user and compatible with the present rollback techniques.

Allocating inode number segments for a new source file system can be implemented as follows. When migrating a new source file system inode numbers within that file system can be analyzed and associated with one or more source inode number segments.

In some examples, depending on whether a source file system is read only, an allowance can be made for allocating additional source inode numbers when an initial source inode number segments are determined.

In some examples, each source inode number segment can be associated with one or more destination inode number segments.

A component can be associated with each source inode number segment to translate each source inode number within a segment to a corresponding destination inode number within a destination file system. A purpose of this component can be to ensure that each source inode number results in a unique destination inode number. In some examples, this component can comprise adding a numeric offset on the source inode number, or performing a bitwise shift on part of the source inode number.

A similar component can be associated with each destination inode number segment to translate each destination inode number within a segment to a corresponding source inode number within the source file system.

In some examples, a system that implements the present techniques can have the following characteristics. A destination file system can provide a capability to allocate an entity with a specific inode number and a specific generation number. Inode number allocation on source and destination file systems can be clustered, which can facilitate using reasonably sized segments.

In some examples, "reasonably sized" can be specific to an implementation, and can be used to address a problem of fragmentation by using relatively large numbers of relatively small segments. For example, where inode number segments each span 10% of an inode number space, then it could be that at most 10 file systems could be consolidated in a migration (where each source file system has at least one corresponding inode number segment). Then, there can be increased overhead involved with managing a relatively large number of small inode number segments and traversing them. In an example where a file system provisions space in chunks (sometimes referred to as slices), a "reasonable size" for an inode number segment can be a number of inodes that fit within one chunk.

Allocating inode number segments can be implemented as follows. In some examples, if at a point during migration, allocation a new inode number on either the source file system or the destination file system would exceed a capacity of existing source inode number segments or destination inode number segments, new segments can be allocated on-demand.

Ensuring that reparent operations on a destination file system allow for transparent migration rollback can be implemented as follows. In some examples, supporting transparent migration rollback in a case of failure can involve ensuring that client reparent requests within a destination file system that cross a boundary of an active migration are rejected with a NFS XDEV "cross device" SMB STATUS_NOT_SAME_DEVICE status. In some examples this causes the client computer to fall back to manually copying the data.

This can be implemented by finding a destination inode number segment for an entity to be moved, and a destination inode number segment for a new parent location. Each destination inode number segment can have an associated migration ID, and where the migration IDs do not match, the operation can be rejected with a "cross device"/"not same device" error.

In some examples, where a cross migration boundary reparent operation was not rejected, and a migration were to be rolled back, the actual data would not be available on the source file system.

In some examples, by rejecting an "atomic" reparent operation and forcing a client computer to copy the data manually, it can be that not all of the data was copied at the point the rollback occurs. However, the client can be able to continue copying the data because the rollback is transparent to the client computer.

Inode number segments can be allocated as follows. In some examples, source inode number segments and associated destination inode number segments can be allocated in certain circumstances.

Before copying data for a given source file system, source inode number segments and associated destination inode number segments can be allocated by allocating inode numbers in use within that source file system, as well as existing destination inode number segments created by migration of other source file systems to the same destination file system. There can be examples where source inode number segments and associated destination inode number segments are allocated after beginning to copy data for a given source file system. In some examples, allocating source inode number segments and associated destination inode number segments before copying data, can lead to less latency in processing intercepted client create requests where source inode number segments are over provisioned to provide for some space for client computers creating new entities.

Source inode number segments and associated destination inode number segments can be allocated on demand where a migration engine copies each new entity (e.g., a directory, a file, an alternate data stream, etc.) from an source file system to a destination file system and discovers that there is no space in an existing source inode number segment or associated destination inode number segment for the source inode number and/or mapped destination inode number.

In such examples, a client computer can attempt to create a new entity after migration has switched over to a destination file server, and there can be no space in an existing source inode number segment or associated destination inode number segment for the source inode number and/or mapped destination inode number of the new entity.

In creating a new entity by a client computer after switchover, even where a client computer is connected to a destination file system, a "syncer" component of an in-band migration product can intercept modification requests (including creations), and apply them to a source file system first, and then apply them to the destination file system where the request succeeds on the source file system. The in-band migration "syncer" component can provide for transparent rollback to a source file system if a migration fails or is cancelled be ensuring that a source file system is up to date with changes made by clients.

A migration engine case for allocating inode number segments can be implemented as follows. When the migration engine copies a new entity from a source file system to a destination file system, the migration engine can use a source inode number of the entity and attempt to find an existing source inode number segment in which that number will fit. Where a suitable existing source inode number segment is not found, one or more new source inode number segments and associated destination inode number segments can be created. The migration engine can create the new entity on the destination file system using a mapped destination inode number that is defined by the destination inode number segment associated with the source inode number segment.

A "syncer" case for allocating inode number segments can be implemented as follows. When a client computer attempts to create a new entity after switchover, an in-band migration syncer can intercept a creation request and attempt to apply it first to a source file system. Where a create request is successful on the source file system, the syncer can have a source inode number of the new entity. The syncer can use the source inode number of the new entity, and attempt to find an existing source inode number segment in which the source inode number fits. Where a suitable existing source inode number segment is not found, one or more new source inode number segments and associated destination inode number segments can be created. The syncer can create the new entity on the destination file system using a mapped destination inode number defined by a destination inode number segment that is associated with the source inode number segment.

Example Architectures

FIG. 1 illustrates an example system architecture 100 that can facilitate efficient transparent rollback of file system consolidation migrations, in accordance with an embodiment of this disclosure.

As depicted, system architecture 100 comprises client computer 102, communications network 104, source system 106A, and destination system 106B. In turn, client computer 102 comprises file handle 112; source system 106A comprises source file system 108A; and destination system 106B comprises destination file system 108B, and efficient transparent rollback of file system consolidation migrations component 110.

Source system 106A can provide client computer 102 with access to source file system 108A, via communications network 104. This access can comprise reading, writing, and creating files on source file system 108A.

A file system migration can occur, where source file system 108A is migrated to destination system 106B as destination file system 108B. Part of this migration (and a subsequent rollback, with corresponding operations) can involve changing a network routing of source system 106A and destination system 106B, such that a network address (e.g., an Internet Protocol (IP) address) or a domain name (e.g., according to a Domain Name System (DNS)) that identified source system 106A prior to the migration now identifies destination system 106B after the migration. This changing can sometimes be referred to as a switchover.

In the course of accessing source file system 108A, client computer 102 can utilize file handle 112, which is a file handle that identifies a specific file in destination file system 108B, and which can be a file handle that was generated by destination system 106B. Client computer 102 can utilize file handle 112 to access destination file system 108B as part of communication 114A.

Later, a rollback of the file system migration can occur (as illustrated by communication 116), where the migration is undone, and client computer 102 returns to accessing source file system 108A instead of destination file system 108B. Herein, the terms "source" and "destination" can refer to the original migration, where a file system is migrated from a source to a destination. Then, using the same terminology for each respective file system, a rollback can occur from a destination to a source.

Efficient transparent rollback of file system consolidation migrations component 110 can facilitate making this rollback transparent to client computer 102. A way that efficient transparent rollback of file system consolidation migrations component 110 can do this is by facilitating client computer 102 using the same file handle 112 that was issued by destination system 106B on source system 106A. This communication by client computer 102 using file handle 112 to access source file system 108A is illustrated by communication 114B.

Figure 10:
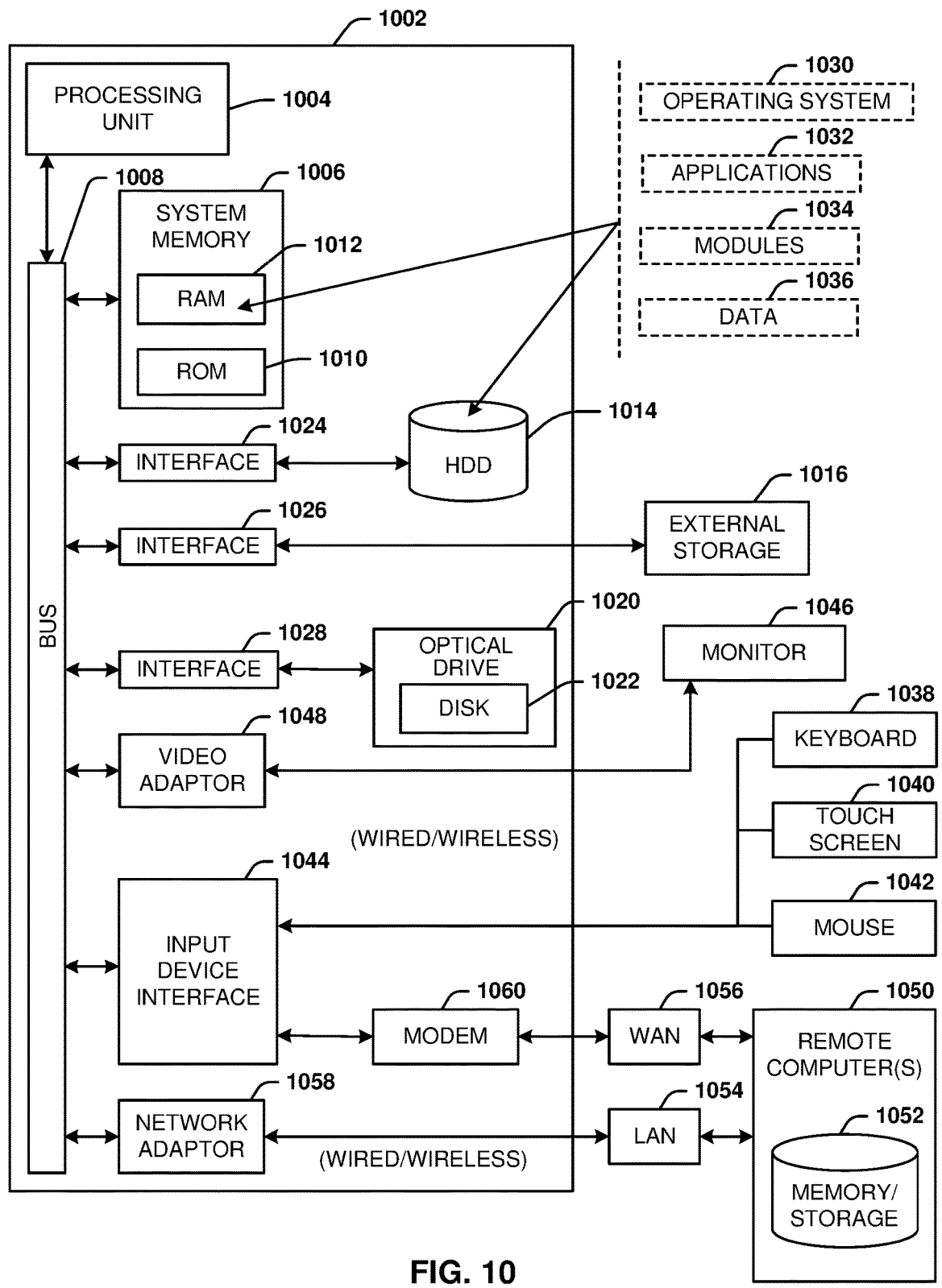
FIG. 10 illustrates an example block diagram of a computer operable to execute an embodiment of this disclosure.

Each of client computer 102, source system 106A, and/or destination system 106B can be implemented with part(s) of computing environment 1000 of FIG. 10. Communications network 104 can comprise a computer communications network, such as the INTERNET.

Figure 7:
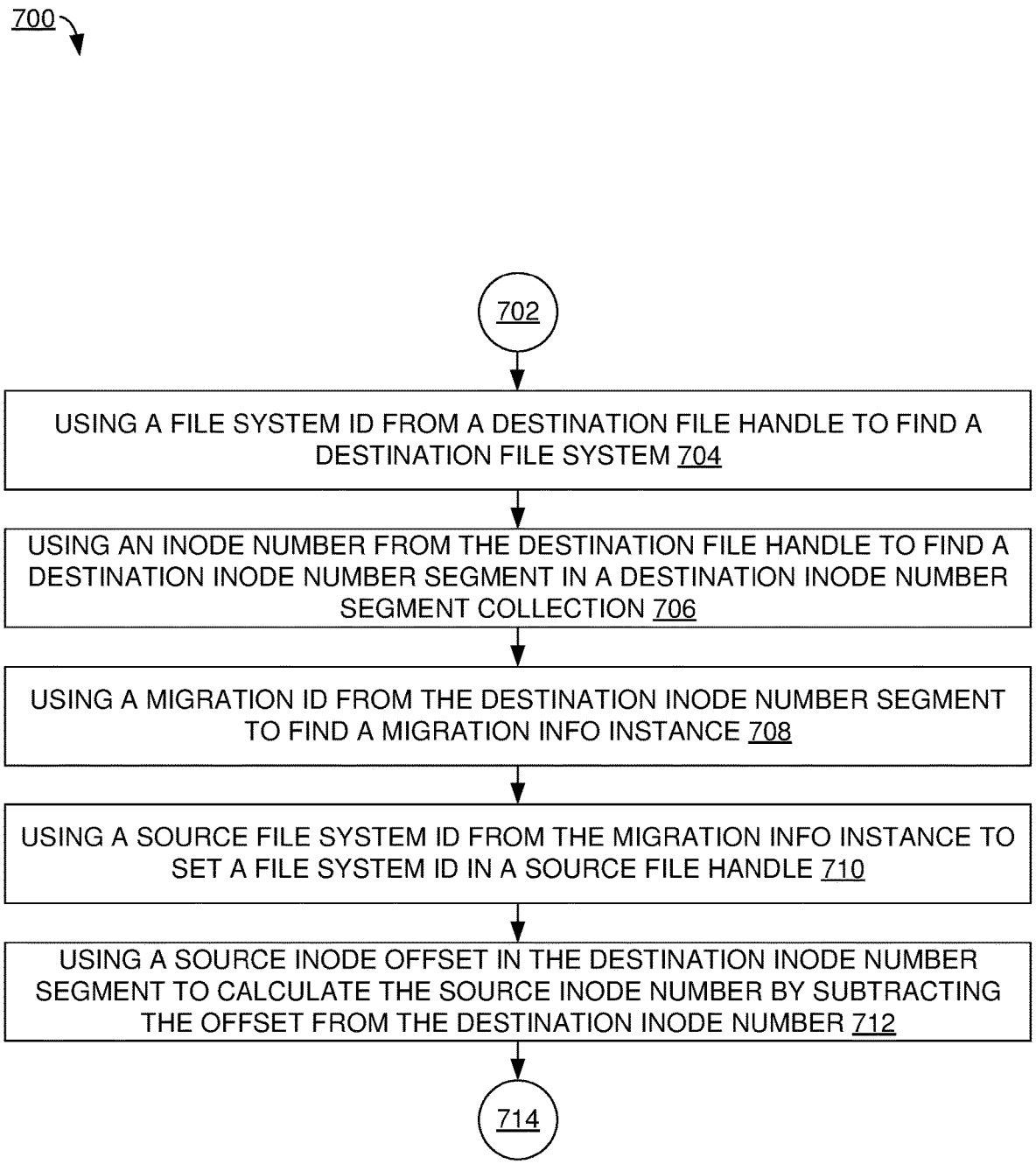
FIG. 7 illustrates an example process flow that can facilitate efficient transparent rollback of file system consolidation migrations, in accordance with an embodiment of this disclosure.
Figure 8:
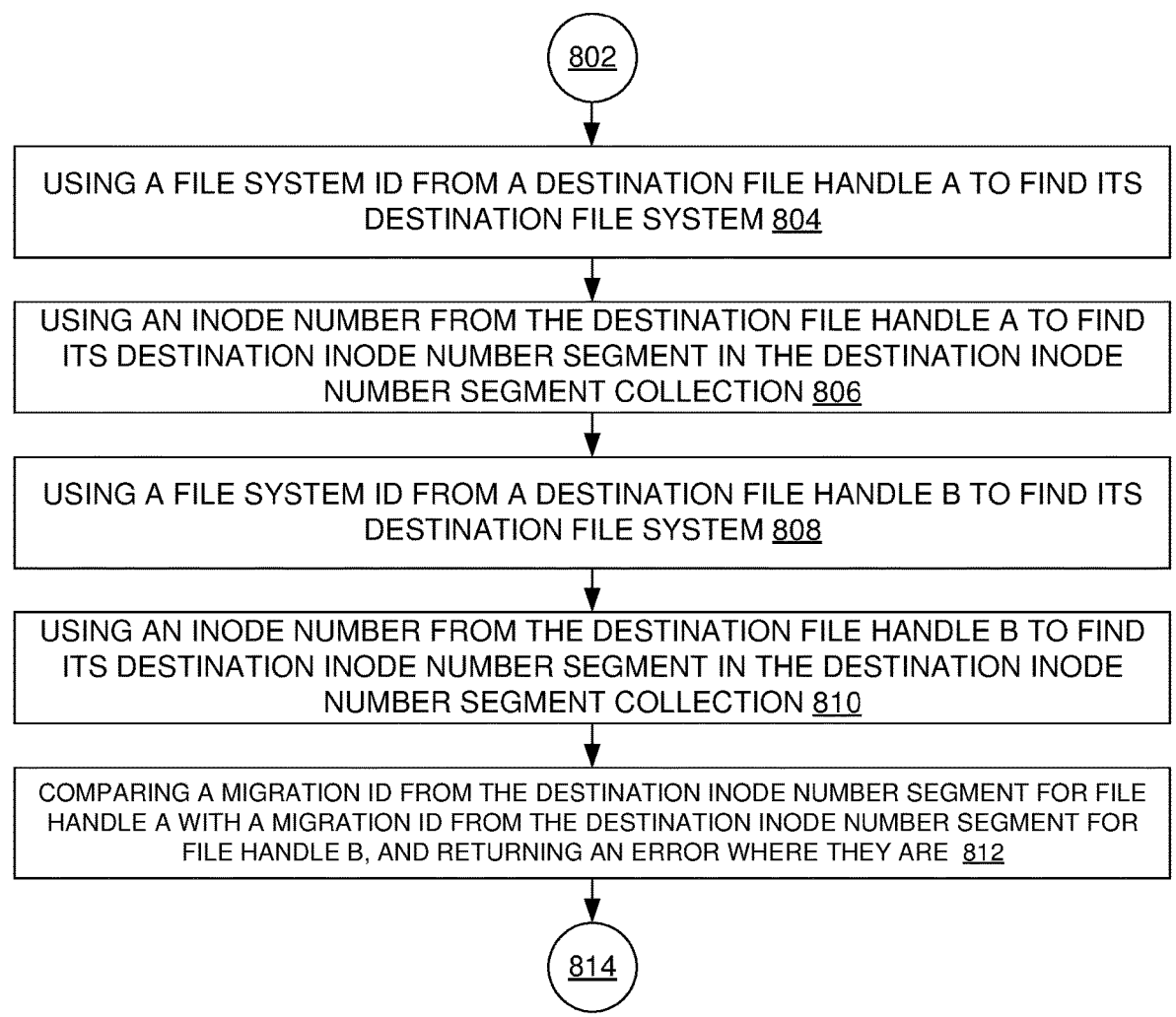
FIG. 8 illustrates an example process flow for transparent rollback using cross device error, and that can facilitate efficient transparent rollback of file system consolidation migrations, in accordance with an embodiment of this disclosure.
Figure 9:
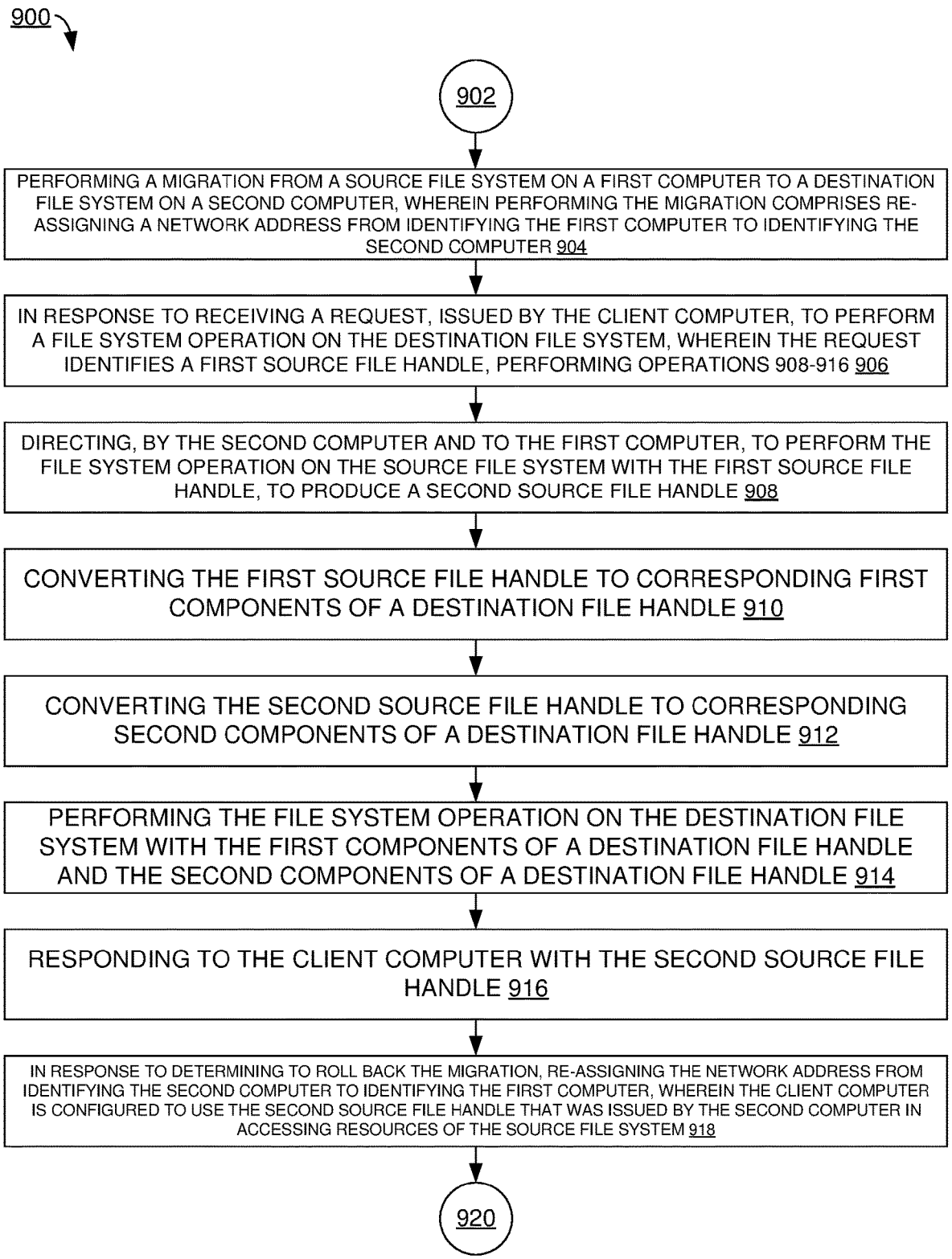
FIG. 9 illustrates another example process flow that can facilitate efficient transparent rollback of file system consolidation migrations, in accordance with an embodiment of this disclosure.

In some examples, efficient transparent rollback of file system consolidation migrations component 110 can implement part(s) of the process flows of FIGS. 7-9 to facilitate efficient transparent rollback of file system consolidation migrations.

It can be appreciated that system architecture 100 is one example system architecture for efficient transparent rollback of file system consolidation migrations, and that there can be other system architectures that facilitate efficient transparent rollback of file system consolidation migrations.

Figure 2:
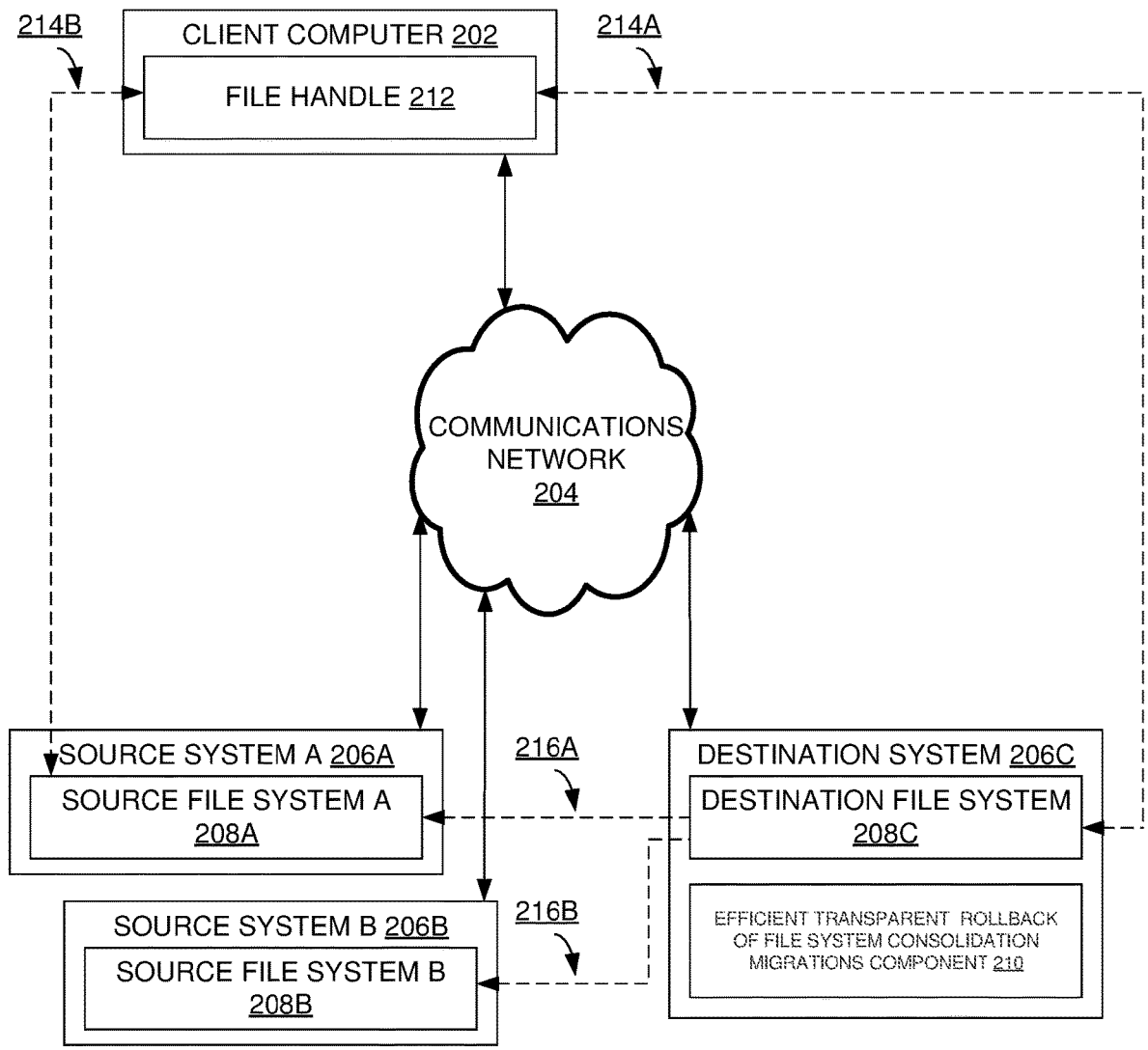
FIG. 2 illustrates another example system architecture of multiple migrated file systems, and that can facilitate efficient transparent rollback of file system consolidation migrations, in accordance with an embodiment of this disclosure.

FIG. 2 illustrates another example system architecture 200 of multiple migrated file systems, and that can facilitate efficient transparent rollback of file system consolidation migrations, in accordance with an embodiment of this disclosure.

As depicted, system architecture 200 comprises client computer 202 (which can be similar to client computer 102 of FIG. 1), communications network 204 (which can be similar to communications network 104), source system 206A (which can be similar to source system 106A), source system 206B (which can be similar to another instance of source system 106A), and destination system 206C (which can be similar to destination system 106B). In turn, client computer 202 comprises file handle 212 (which can be similar to file handle 112); source system 206A comprises source file system 208A (which can be similar to source file system 108A); source system 206B comprises source file system 208B (which can be similar to another instance of source file system 108A); and destination system 206C comprises destination file system 208C (which can be similar to destination file system 108B), and efficient transparent rollback of file system consolidation migrations component 210 (which can be similar to efficient transparent rollback of file system consolidation migrations component 110).

Client computer 202 can utilize file handle 212 to access destination file system 208C after a migration (as illustrated by communication 214A), and can utilize file handle 212 to access source file system 208A after a rollback of that migration (as illustrated by communication 214B). As depicted, destination file system 208C comprises a migration of multiple file systems—a migration of source file system A 208A, and a migration of source file system B 208B. Both of these file system migrations can be rolled back, as depicted by communication 216A (rolling back file system A 208A), and communication 216B (rolling back file system B 216B).

Similar to the example of system architecture 100 of FIG. 1, where destination file system 208C comprises a migration of multiple file systems, efficient transparent rollback of file system consolidation migrations component 210 can facilitate transparent file handle usage at each of source file system A 208A and source file system B 208B of file handles originated for destination file system 208C.

FIG. 3 illustrates a system architecture 300 of a file handle that can facilitate efficient transparent rollback of file system consolidation migrations, in accordance with an embodiment of this disclosure.

As depicted, system architecture 300 comprises file handle 302 (which can be similar to file handle 112 of FIG. 1, and/or file handle 212 of FIG. 2), and efficient transparent rollback of file system consolidation migrations component 310 (which can be similar to efficient transparent rollback of file system consolidation migrations component 110 of FIG. 1, and/or efficient transparent rollback of file system consolidation migrations component 210 of FIG. 2).

In turn, file handle 302 comprises file system ID 304, inode number 306, and generation number 308. File system ID 304 can identify a file system that file handle 302 is used with (e.g., source file system 108A of FIG. 1). Inode number 306 identifies an inode within the file system in which the file identified by file handle 302 is stored. Generation number 308 identifies a generation number, where a file system can generate different inode numbers at different times for an object stored in the file system.

In effectuating efficient transparent rollback of file system consolidation, efficient transparent rollback of file system consolidation migrations component 110 of FIG. 1 can modify information stored in file handle 302, such as translating a file system ID to a file system ID from where the file system was migrated to (e.g., where the file system migration was rolled back to), and adjusting an inode number by an offset value to identify an inode number in the source file system.

Figure 4:
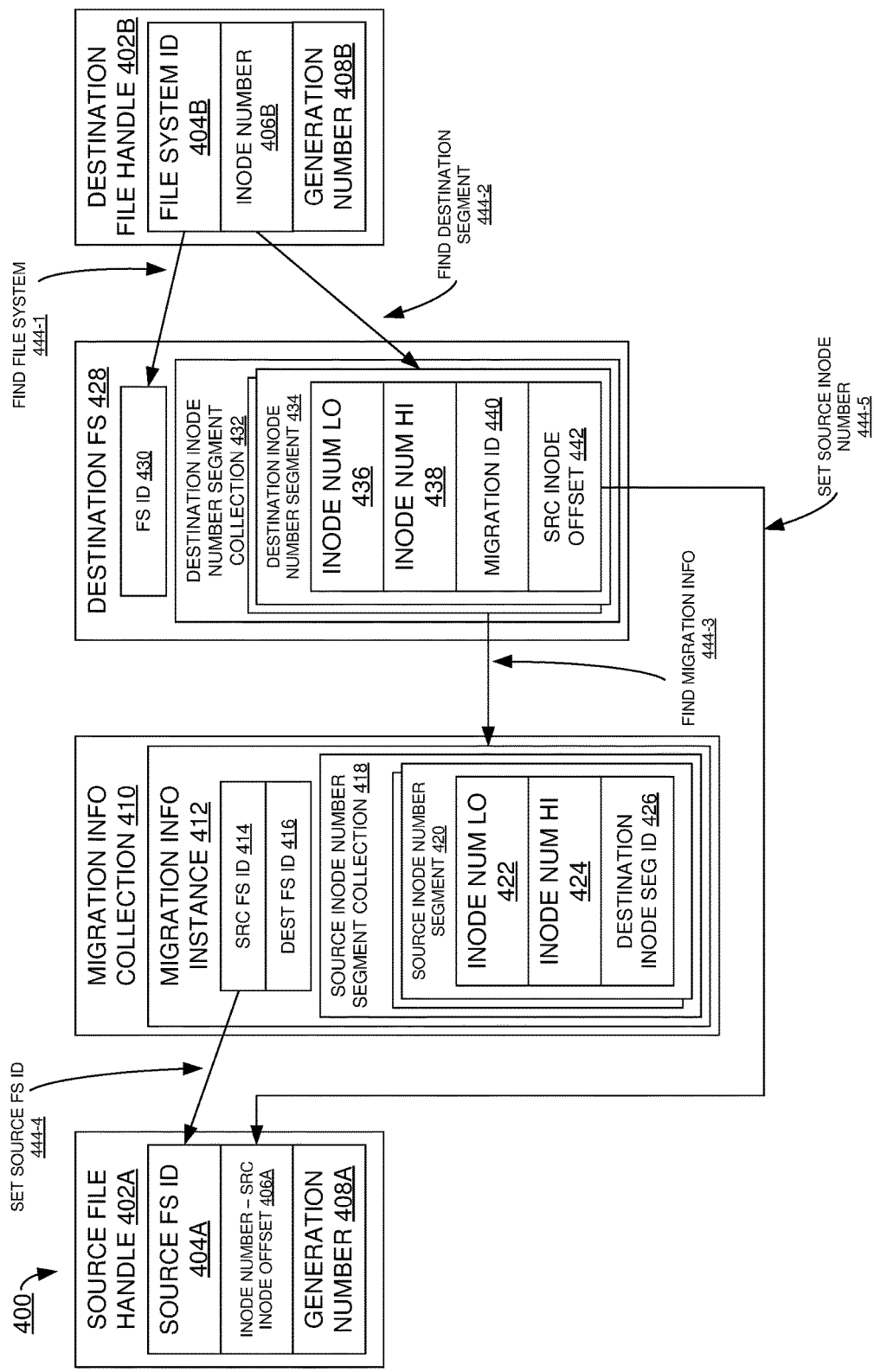
FIG. 4 illustrates an example system architecture for returning source file handles from the destination after switchover, and that can facilitate efficient transparent rollback of file system consolidation migrations, in accordance with an embodiment of this disclosure.

FIG. 4 illustrates an example system architecture 400 for returning source file handles from the destination after switchover, and that can facilitate efficient transparent rollback of file system consolidation migrations, in accordance with an embodiment of this disclosure.

Returning source file handles from a destination after switchover can be implemented as follows. In some examples, in order to support transparent rollback, source file handles can be returned to clients after switchover so that the client computers can continue to use them where there is a migration failure and the migration is rolled back. Mapping destination file handles can be implemented so that they can be used on a source file system in the case of a migration rollback.

System architecture 400 comprises source file handle 402A, migration info collection 410, destination file system 428, and destination file handle 402B.

Source file handle 402A can be similar to file handle 302 of FIG. 3, with source file system ID 404A being similar to file system ID 304, inode number—src inode offset 406A being similar to inode number 306, and generation number 408A being similar to generation number 308. Similarly, destination file handle 402B can be similar to file handle 302, with file system ID 404B being similar to file system ID 304, inode number 406B being similar to inode number 306, and generation number 408B being similar to generation number 308.

In some examples, destination file handle 402B can be a file handle used by client computer 102 with destination system 106B. Where destination file system 108B is rolled back to source file system 108A, client computer 102 can still use destination file handle 402B, and efficient transparent rollback of file system consolidation migrations component 110 can translate destination file handle 402B into source file handle 402A, which can be used on the source file system. This can be accomplished by efficient transparent rollback of file system consolidation migrations component 110 utilizing migration info collection 410 and destination file system 428.

Migration info collection 410 comprises migration info instance 412. In the example of FIG. 4, there is one migration info instance because there is one migrated file system. There can be examples where there are multiple migrated file systems, and where a migration info collection comprises multiple migration info instances, like in FIG. 5. Migration info instance 412 comprises source file system ID 414 and destination file system ID 416. Source file system ID 414 and destination file system ID 416 can be used to translate between a source file system and a destination file system. Migration info instance 412 also comprises source inode number segment collection 418, which can comprise a group of source inode number segments, which includes source inode number segment 420.

Each source inode number segment of source inode number segment collection 418 identifies a range of source inode numbers covered by that source inode number segment (here, the range is bounded by inode num lo 422 and inode num hi 424). Each source inode number segment of source inode number segment collection 418 also comprises a destination inode segment ID 426, which identifies a destination inode number segment of destination file system 428.

Destination file system 428 comprises file system ID 430 and destination inode number segment collection 432. Destination inode number segment collection 432 comprises destination inode number segment 434. Similar to source inode number segment collection 418, each destination inode number segment of destination inode number segment collection 432 comprises a range of inode numbers (bounded by inode num lo 436 and inode num hi 438, migration ID 440, and source inode offset 442. Migration ID 440 identifies a particular migration that the destination inode number segment relates to, and source inode offset 442 can identify a numerical value to subtract (or otherwise combine with) from a destination inode number to determine a source inode number (e.g., to translate inode number 406B to inode number—source inode offset 406A).

Efficient transparent rollback of file system consolidation migrations component 110 of FIG. 1 can translate destination file handle 402B to source file handle 402A, so that client computer 102 can utilize destination file handle 402B with a source file system (e.g., source file system 106A). Efficient transparent rollback of file system consolidation migrations component 110 can effectuate the following communications to do this.

File system ID 404B can be used to identify file system ID 430 (and destination file system 428) via find file system 444-1. Inode number 406B can be used to identify a destination inode number segment of destination inode number segment 434 within the destination file system, via find destination segment 444-2.

Migration ID 440 of the destination inode number segment can be used to identify migration info instance 412, via find migration info 444-3. Source file system ID 414 of migration info instance 414 can be used to set source file system ID 404A, via set source file system ID 444-4. Source inode offset 442 of the identified destination inode number segment can be utilized to translate between an inode number of destination file handle 402B and source file handle 402A, by setting inode number—source inode offset 406A, via set source inode number 444-5 (where inode number—source inode offset 406A is a combination of inode number 406B and source inode offset 442).

This example of system architecture 400 can involve a 1:1 mapping between source inode number segments and destination inode number segments, where segment sizes are defined using inode number ranges, and an offset is used to translate source inode numbers to destination inode numbers.

Returning source file handles from a destination after switchover can be performed as follows.
1. The file system ID from a destination file handle can be used to find a destination file system. This can be communication 444-1.
2. The inode number from the destination file handle can be used to find a destination inode number segment in the destination inode number segment collection by looking for a segment where inode num lo<=inode number <=inode num hi (e.g., the range of inode numbers in the segment includes the inode number of the source file handle). This can be communication 444-2.
3. The migration ID from the destination inode number segment can be used to find a migration info instance. This can be communication 444-3.
4. The source file system ID from the migration info instance can be used to set a file system ID in the source file handle. This can be communication 444-4.
5. The source inode offset in the destination inode number segment can be used to calculate the source inode number by subtracting the offset from the destination inode number. This can be communication 444-5.

In some examples, inode numbers are mapped, and generation numbers are not mapped. That is, generation numbers used in resulting destination file handles can be the same as in the source file handles.

Figure 5:
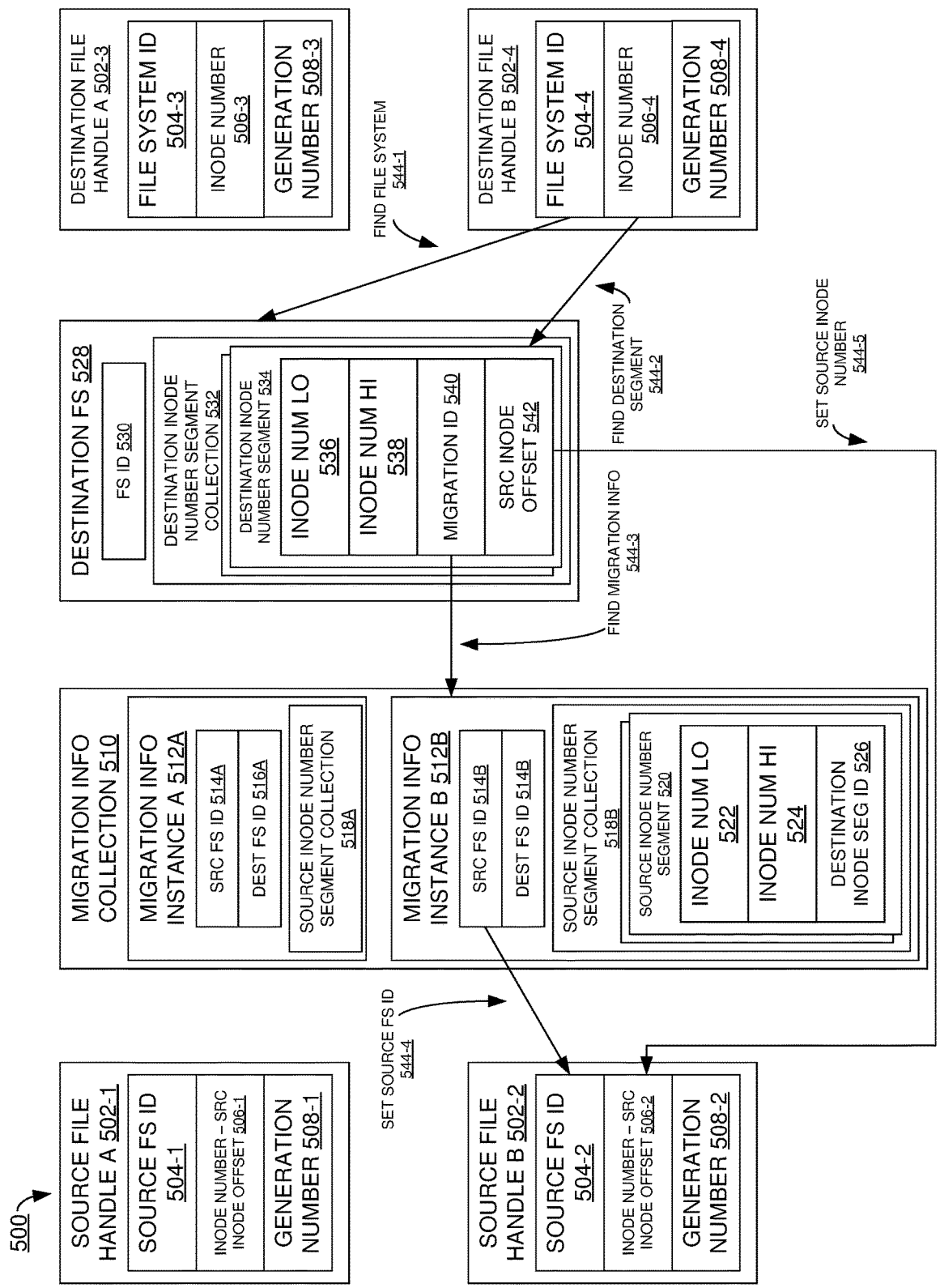
FIG. 5 illustrates an example system architecture for returning source file handles from the destination after switchover with multiple migrated file systems, and that can facilitate efficient transparent rollback of file system consolidation migrations, in accordance with an embodiment of this disclosure.

FIG. 5 illustrates an example system architecture 500 for returning source file handles from the destination after switchover with multiple migrated file systems, and that can facilitate efficient transparent rollback of file system consolidation migrations, in accordance with an embodiment of this disclosure. For example, after migration, a file handle can be created by the destination file system and provided to a client computer. Then, a rollback of the migration can occur, and system architecture 500 can be implemented to facilitate the client computer in continuing to use the file handle that was issued by the destination file system on the source file system.

System architecture 500 can be similar to system architecture 400 of FIG. 4, where multiple source file systems have been migrated to one destination file system, compared to one source file system being migrated in system architecture 400.

System architecture 500 comprises source file handle A 502-1, source file handle B 502-2, migration info collection 510, destination file system 528, destination file handle A 502-3, and destination file handle B 502-4.

Source file handle A 502-1 and source file handle B 502-2 can each be similar to an instance of source file handle 402A of FIG. 4 (where the two file handles are originated by different file systems). Likewise, each of source file system ID 504-1 and source file system ID 504-2 can be similar to file system ID 404A; each of inode number—source inode offset 506-1 and inode number—source inode offset 506-2 can be similar to inode number 406A; and each of generation number 508-1 and generation number 508-2 can be similar to generation number 408A.

Destination file handle A 502-3 and destination file handle B 502-4 can each be similar to an instance of destination file handle 402B of FIG. 4, where destination file handle A 502-3 corresponds to source file handle A 502-1, and destination file handle A 502-4 corresponds to source file handle A 502-2. Likewise, each of file system ID 504-3 and file system ID 504-3 can be similar to file system ID 404B; each of inode number 506-3 and inode number 506-4 can be similar to inode number 406B; and each of generation number 508-3 and generation number 508-4 can be similar to generation number 408B.

Migration info collection 510 can be similar to migration info collection 410, where migration info collection 510 comprises multiple migration info instances instead of one. Migration info instance A 512A can correspond to source file handle A 502-1 and migration info instance B 512B can correspond to source file handle B 502-2. Each of source file system ID 514A and source file system ID 514B can be similar to source file system ID 414; each of destination file system ID 516A and destination file system ID 516B can be similar to destination file system ID 416; and each of source inode number segment collection 518A and source inode number segment collection 518B can be similar to source inode number segment collection 418.

Within source inode number segment collection 518B, source inode number segment 520 can be similar to source inode number segment 420; inode num lo 522 can be similar to inode num low 422; inode num hi 524 can be similar to inode num hi 424; and destination inode segment ID 526 can be similar to destination inode segment ID 426.

Destination file system 528 can be similar to destination file system 428. Within destination file system 528, file system ID 530 can be similar to file system ID 430, destination inode number segment collection 532 can be similar to destination inode number segment collection 432; destination inode number segment 534 can be similar to destination inode number segment 434; inode num lo 536 can be similar to inode num lo 436; inode num hi 538 can be similar to inode num hi 438; migration ID 540 can be similar to migration ID 440; and source inode offset 542 can be similar to source inode offset 442.

Efficient transparent rollback of file system consolidation migrations component 110 can translate destination file handle A 502-3 into source file handle A 502-1, which can be used on the source file system, and can translate destination file handle B 502-4 into source file handle B 502-2, which also can be used on the source file system. This can be accomplished by efficient transparent rollback of file system consolidation migrations component 110 utilizing migration info collection 510 and destination file system 528.

The communications for translating destination file handle B 502-4 to source file handle B 502-2 can be similar to the communications of FIG. 4. In general, when using multiple migrated file systems, each migrated file system can have its own migration info instance within migration info collection 510, which using the same information within destination file system 528.

That is, communication 544-1 can be similar to communication 444-1; communication 544-2 can be similar to communication 444-2; communication 544-3 can be similar to communication 444-3; communication 544-4 can be similar to communication 444-4; and communication 544-5 can be similar to communication 444-5. In these communications of FIG. 5, migration info instance B 512B can be utilized, where migration info instance 512A can correspond to migration info instance 412 (e.g., migration info instance A 512A is used with source file handle A 502-1, while migration info instance B 512B is used with destination file handle B 502-B).

Figure 6:
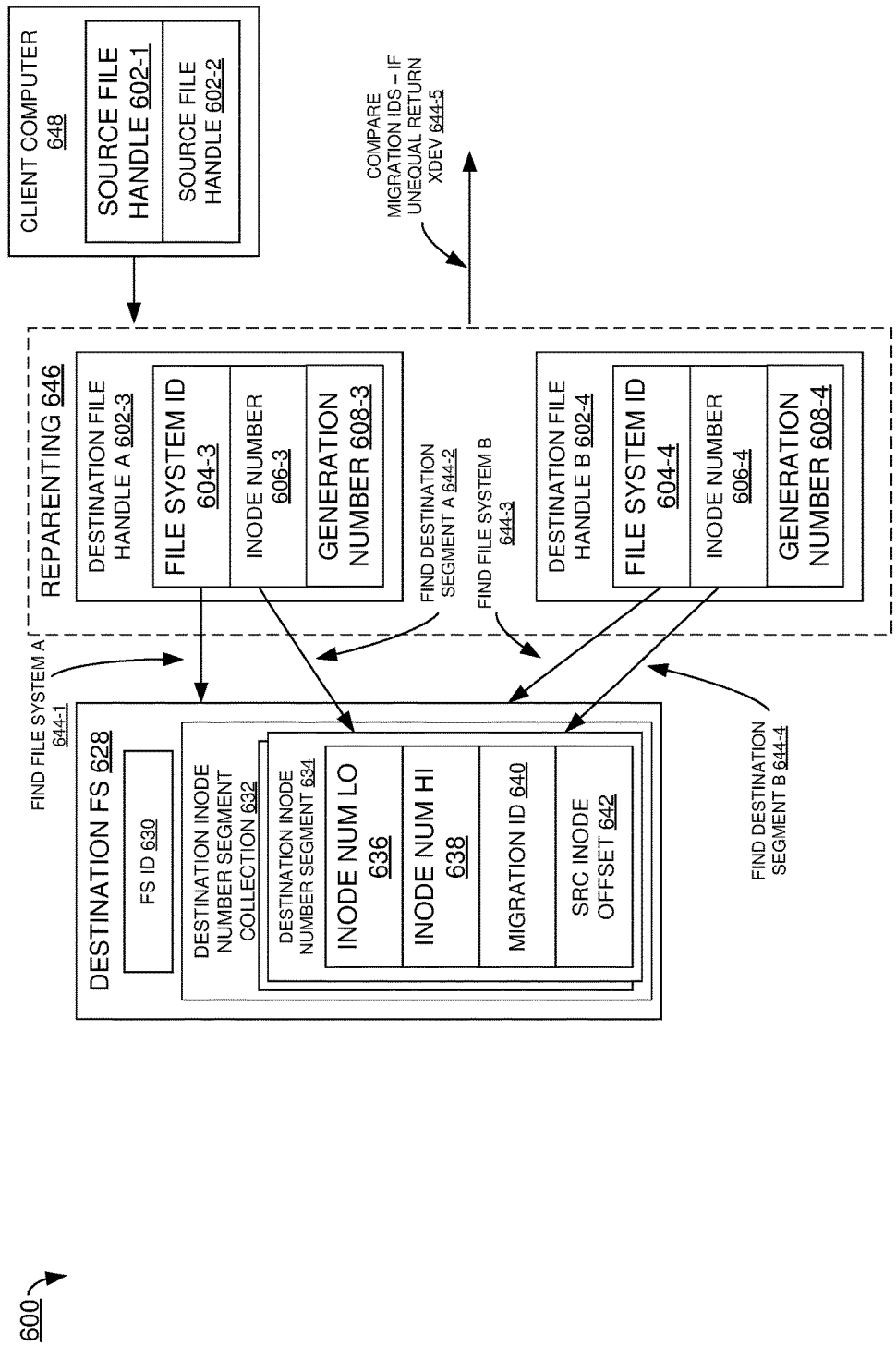
FIG. 6 illustrates an example system architecture for transparent rollback using cross device error, and that can facilitate efficient transparent rollback of file system consolidation migrations, in accordance with an embodiment of this disclosure.

FIG. 6 illustrates an example system architecture 600 for transparent rollback using cross device error, and that can facilitate efficient transparent rollback of file system consolidation migrations, in accordance with an embodiment of this disclosure.

System architecture comprises destination file system 628, reparenting 646, and client computer 648. Destination file system 628 can be similar to destination file system 428. Within destination file system 628, file system ID 630 can be similar to file system ID 430, destination inode number segment collection 632 can be similar to destination inode number segment collection 432; destination inode number segment 634 can be similar to destination inode number segment 434; inode num lo 636 can be similar to inode num lo 436; inode num hi 638 can be similar to inode num hi 438; migration ID 640 can be similar to migration ID 440; and source inode offset 642 can be similar to source inode offset 442. Client computer 648 can be similar to client computer 102 of FIG. 1, with each of source file handle 602-1 and source file handle 602-2 being similar to an instance of file handle 112.

Client computer 648 can issue a reparenting file system operation to a destination file system (e.g., destination file system 108B of FIG. 1), where the operation identifies source file handle 602-1 and source file handle 602-2 as arguments to the reparenting operation.

To determine whether this reparenting operation crosses a migration boundary, the destination file system can convert source file handle 602-1 and source file handle 602-2 to destination file handles—depicted here as destination file handle 602-3 and destination file handle 602-4 of reparenting 646, respectively. Reparenting 646 can indicate the reparenting operation as processed by the destination file system to determine whether the reparenting operation crosses a migration boundary.

Reparenting 646 can comprise two destination file handles that are being reparented. Destination file handle A 602-3 and destination file handle B 602-4 can each be similar to an instance of destination file handle 402B of FIG. 4. Likewise, each of destination file system ID 604-3 and destination file system ID 604-3 can be similar to destination file system ID 404B; each of inode number 606-3 and inode number 606-4 can be similar to inode number+source inode offset 406B; and each of generation number 608-3 and generation number 608-4 can be similar to generation number 408B.

Efficient transparent rollback of file system consolidation migrations component 110 of FIG. 1 can effectuate transparent rollback using cross device error using the following communications. File system ID 604-3 can be used to identify destination file system 628, via find file system A 644-1. Inode number 606-3 can be used to identify a destination inode number segment of destination inode number segments 634, via find destination segment A 644-2.

File system ID 604-4 can be used to identify destination file system 628, via find file system B 644-3. Inode number 606-4 can be used to identify a destination inode number segment of destination inode number segments 634, via find destination segment B 644-4.

Then migration IDs can be compared (e.g., a first instance of migration ID 640 of a destination inode number segment that corresponds to destination file handle A 602-3 with a second instance of migration ID 640 of a destination inode number segment that corresponds to destination file handle A 602-4). Where the migration IDs are unequal, an XDEV message can be returned to a client computer (e.g., client computer 102 of FIG. 1), via compare migration IDs—if unequal return XDEV 644-5.

Enabling transparent rollback using cross device error can be implemented as follows. A reparent operation that crosses a migration boundary can result in an NFS XDEV "cross device" or SMB STATUS_NOT_SAME_DEVICE error to be returned to the client computer so that the client computer can manually copy the data, facilitating transparent rollback. This can be effectuated through the following operations.

1. The file system ID from a destination file handle A can be used to find its destination file system. This can be communication 644-1.
2. The inode number from the destination file handle A can be used to find its destination inode number segment in the destination inode number segment collection by looking for a segment where inode num Lo<=inode number <=inode num Hi (e.g., the range of inode numbers in the segment includes the inode number of the source file handle). This can be communication 644-2.
3. The file system ID from the destination file handle B can be used to find its destination file system. This can be communication 644-3.
4. The inode number from the destination file handle B can be used to find its destination inode number segment in the destination inode number segment collection by looking for a segment where inode num Lo<=inode number <=inode num Hi. This can be communication 644-4.
5. The migration ID from the destination inode number segment for file handle A can be compared with the migration ID from the destination inode number segment for file handle B. Where they are not equal, a NFS "Cross Device" (XDEV) error or Server Message Block (SMB) protocol SMB STATUS_NOT_SAME_DEVICE error can be returned. This can be communication 644-5.

In some examples, an error (e.g., an XDEV error) can be used to reject operations that create links (e.g., hard links that comprise respective directory entries that associate a name with a file in a file system, and in some examples, soft links that link to other files using their path in a file system) across migration boundaries In some system architectures, a hard link can create a new directory entry that directly references a specified inode. A comparison between two file handles involving a hard link can compare a destination file handle of a directory that the link is to be created in with a destination file handle of an inode to be linked to. These file handles can be received from a client computer as source file handles, and then translated to destination file handles.

In some system architectures, a soft link can create a new directory entry that specifies a new path name. A comparison between two file handles involving a soft link can compare a destination file handle of a directory that the link is to be created in with a destination file handle of the specified path. The directory can be received from a client computer as a source file handle and translated into a destination file handle. The specified path can be looked up on the destination file system directly, and a destination file handle found (where the path exists on the destination file system). There can be ways to configure soft links that span multiple file systems and multiple servers. As such, rejecting cross-boundary soft links can be implemented in some examples, and in other examples they can be created and configured to function in case of a rollback.

As such, errors (e.g., XDEV errors) can be issued to reject operations that can cause unresolved data references in the case of rollback.

Example Process Flows

FIG. 7 illustrates an example process flow 700 that can facilitate efficient transparent rollback of file system consolidation migrations, in accordance with an embodiment of this disclosure. In some examples, one or more embodiments of process flow 700 can be implemented by efficient transparent rollback of file system consolidation migrations component 110 of FIG. 1, efficient transparent rollback of file system consolidation migrations component 210 of FIG. 2, or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 800 of FIG. 8, and/or process flow 900 of FIG. 9.

Process flow 700 begins with 702, and moves to operation 704. Operation 704 depicts using a file system ID from a destination file handle to find a destination file system. In some examples, operation 704 can be implemented in a similar manner as communication 444-1 of FIG. 4.

After operation 704, process flow 700 moves to operation 706.

Operation 706 depicts using an inode number from the destination file handle to find a destination inode number segment in a destination inode number segment collection. In some examples, operation 706 can be implemented in a similar manner as communication 444-2 of FIG. 4.

After operation 706, process flow 700 moves to operation 708.

Operation 708 depicts using a migration ID from the destination inode number segment to find a migration info instance. In some examples, operation 708 can be implemented in a similar manner as communication 444-3 of FIG. 4.

After operation 708, process flow 700 moves to operation 710.

Operation 710 depicts using a source file system ID from the migration info instance to set a file system ID in a source file handle. In some examples, operation 708 can be implemented in a similar manner as communication 444-4 of FIG. 4.

After operation 710, process flow 700 moves to operation 712.

Operation 712 depicts using a source inode offset in the destination inode number segment to calculate the source inode number by subtracting the offset from the destination inode number. In some examples, operation 708 can be implemented in a similar manner as communication 444-5 of FIG. 4.

After operation 712, process flow 700 moves to 714, where process flow 700 ends.

FIG. 8 illustrates an example process flow 800 for transparent rollback using cross device error, and that can facilitate efficient transparent rollback of file system consolidation migrations, in accordance with an embodiment of this disclosure. In some examples, one or more embodiments of process flow 800 can be implemented by efficient transparent rollback of file system consolidation migrations component 110 of FIG. 1, efficient transparent rollback of file system consolidation migrations component 210 of FIG. 2, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 700 of FIG. 7, and/or process flow 900 of FIG. 9.

Process flow 800 begins with 802, and moves to operation 804. Operation 804 depicts using a file system ID from a destination file handle A to find its destination file system. In some examples, operation 804 can be implemented in a similar manner as communication 644-1 of FIG. 6.

After operation 804, process flow 800 moves to operation 806.

Operation 806 depicts using an inode number from the destination file handle A to find its destination inode number segment in the destination inode number segment collection. In some examples, operation 806 can be implemented in a similar manner as communication 644-2 of FIG. 6.

After operation 806, process flow 800 moves to operation 808.

Operation 808 depicts using a file system ID from a destination file handle B to find its destination file system. In some examples, operation 808 can be implemented in a similar manner as communication 644-3 of FIG. 6.

After operation 808, process flow 800 moves to operation 810.

Operation 810 depicts using an inode number from the destination file handle B to find its destination inode number segment in the destination inode number segment collection. In some examples, operation 808 can be implemented in a similar manner as communication 644-4 of FIG. 6.

After operation 810, process flow 800 moves to operation 812.

Operation 812 depicts comparing a migration ID from the destination inode number segment for file handle A with a migration ID from the destination inode number segment for file handle B, and returning an error where they are unequal. In some examples, operation 808 can be implemented in a similar manner as communication 644-5 of FIG. 6.

After operation 812, process flow 800 moves to 814, where process flow 800 ends.

FIG. 9 illustrates an example process flow 900 that can facilitate efficient transparent rollback of file system consolidation migrations, in accordance with an embodiment of this disclosure. In some examples, one or more embodiments of process flow 900 can be implemented by efficient transparent rollback of file system consolidation migrations component 110 of FIG. 1, efficient transparent rollback of file system consolidation migrations component 210 of FIG. 2, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 700 of FIG. 7, and/or process flow 800 of FIG. 8.

Process flow 900 begins with 902, and moves to operation 904. Operation 904 depicts performing a migration from a source file system on a first computer to a destination file system on a second computer, wherein performing the migration comprises re-assigning a network address from identifying the first computer to identifying the second computer. For example, source file system A 108A of FIG. 1 can be migrated to source file system B 108B. Then, a switchover can occur where a network address used by client computer 102 to access source system 106A is re-assigned to direct to destination system 106B so that the client can continue to use the same network address to access a file system, even though the file system has been migrated to a different computer.

After operation 904, process flow 900 moves to operation 906.

Operation 906 depicts, in response to receiving a request, issued by the client computer, to perform a file system operation on the destination file system, wherein the request identifies a first source file handle, performing operations 908-916. That is, after migration, a client computer can still be using file handles issued by the source file system before the migration, even though the client is directing its requests to the destination file system.

After operation 906, process flow 900 moves to operation 908.

Operation 908 depicts directing, by the second computer and to the first computer, to perform the file system operation on the source file system with the first source file handle, to produce a second source file handle. That is, a computer that hosts the destination file system can initially cause the source file system to perform the file system operation, so that the source and destination file system stay in sync. That way, where there is a rollback of the migration, the source file system can have the same data as the destination file system.

After operation 908, process flow 900 moves to operation 910.

Operation 910 depicts converting the first source file handle to corresponding first components of a destination file handle. This can comprise, e.g., converting source file handle 402A of FIG. 4 into the components of destination file handle 402B of FIG. 4. Where the destination file system uses a destination file handle internally, and does not return it to a client computer, the destination file system can assemble a destination file handle, or can use its component information (e.g., file system ID 404B, inode number 406B, and generation number 408B) without combining this information into a file handle data structure.

In some examples, operation 910 comprises determining a destination inode number of the first components of a destination file handle based on performing a mathematical conversion on a source inode number of the first source file handle. That is, source inode numbers and destination inode numbers can be translated between each other using offsets, such as src inode offset 442 of FIG. 4.

In some examples, operation 910 comprises setting a first generation number of the first source file handle to equal a second generation number of the first components of a destination file handle. Using the example of FIG. 4, generation number 408A of source file handle 402A can be equal to generation number 408B of destination file handle 402B.

In some examples, the first components of a destination file handle comprise an identifier of the destination file system, a destination inode number, and a generation number. That is, the components of a destination file handle can comprise file system ID 404B of FIG. 4, inode number 406B, and generation number 408B.

In some examples, the first source file handle comprises an identifier of the source file system, a source inode number, and the generation number. That is, the first source file handle can comprise source filesystem ID 404A, inode number—src inode offset 406A, and generation number 408A.

In some examples, operation 910 comprises determining a first inode number for the first components of a destination file handle based on subtracting an inode offset to a second inode number for the first source file handle, adding the inode offset to the second inode number, or bitwise shifting at least part of the second inode number. That is, conversions between a source inode number and a destination number can be made similar as described with respect to FIG. 4, where a numerical offset can be added or subtracted to convert from a destination inode number to a source inode number, and the opposite can be performed to convert from a source inode number to a destination inode number.

After operation 910, process flow 900 moves to operation 912.

Operation 912 depicts converting the second source file handle to corresponding second components of a destination file handle. This can be performed in a similar manner as operation 910.

After operation 912, process flow 900 moves to operation 914.

Operation 914 depicts performing the file system operation on the destination file system with the first components of a destination file handle and the second components of a destination file handle. After the file system operation is performed on the source file system, the destination file system can also perform the file system operation, to keep the source file system and the destination file system in sync.

After operation 914, process flow 900 moves to operation 916.

Operation 916 depicts responding to the client computer with the second source file handle. This can be a source file handle generated as a result of creating an entity on the source file system. The second computer (which hosts the destination file system) can respond to the client with source file handles to facilitate transparent rollback. In such a case where the client computer has source file handles (and not destination file handles), the client computer can communicate with the source file system (after rollback) directly using those same source file handles, and without the first computer (which hosts the source file system) needing to translate destination file handles into source file handles.

After operation 916, process flow 900 moves to operation 918.

Operation 918 depicts, in response to determining to roll back the migration, re-assigning the network address from identifying the second computer to identifying the first computer, wherein the client computer is configured to use the second source file handle that was issued by the second computer in accessing resources of the source file system. That is, using the example of FIG. 1, a roll back (of the migration in operation 904) can be made from destination file system 108B to source file system 108A. This can involve altering a network configuration so that the network address used by the client to access either the source computer or the destination computer is changed from identifying the destination computer to identifying the source computer. Subsequent to that network address change, when using that network address, the client can access the source file system (since the migration has been rolled back to the source file system).

In some examples, the source file system is a first source file system, and the file system operation is a first file system operation. In such examples, operation 918 can comprise in response to receiving a second request to perform a second file system operation on the destination file system, wherein the request identifies a third source file handle, and wherein the third source file handle corresponds to a second source file system that has been migrated to the destination file system, directing, by the second computer and to a third computer that hosts the second source file system, to perform the second file system operation on the second source file system with the third source file handle, to produce a fourth source file handle, converting the third source file handle to corresponding third components of a destination file handle, converting the fourth source file handle to a corresponding fourth components of a destination file handle, performing the second system operation on the destination file system with the third components of a destination file handle and the fourth components of a destination file handle, and responding to the second request with the fourth source file handle; and wherein, after rolling back the migration, the fourth source file handle is configured for use in accessing resources of the second source file system. That is, multiple source file systems can be migrated to the destination file system, and corresponding source file handles of the source file systems can be used by the destination file system and returned to client computers.

In some examples, the source file system is a first source file system, and the client computer is a first client computer. In such examples, operation 918 can comprise receiving a second request, from a reparenting client computer that comprises the first client computer or a second client computer, to perform a reparenting operation, wherein the third request identifies a third source file handle that indicates a current directory of an object being moved, a current name of the object being moved, a fourth source file handle that indicates a new directory to which the object is being moved, and a new name of the object after being moved; converting the third source file handle into third components of a destination file handle; converting the fourth source file handle into fourth components of a destination file handle; and in response determining that the reparenting operation crosses a migration boundary where a migration identifier of the third components of a destination file handle differs from a migration identifier of the fourth components of a destination file handle, wherein the migration boundary indicates that the current directory corresponds to a first migration of the first source file system the new directory corresponds to a second migration of a second source file system, returning an error to the reparenting client computer, wherein the reparenting client computer processes the error by requesting copying of the object being moved on the destination file system. That is, reparenting across a migration boundary between two migrated source file systems on the destination file system can be handled by returning an error to a client computer that prompts the client computer to perform a copy operation to move the entity (rather than a reparenting operation).

In some examples, that involve reparenting, operation 918 comprises, in response to the reparenting operation being determined to occur within the migration boundary, performing the reparenting operation on the destination file system. That is, where a reparenting operation occurs within a migration boundary (e.g., within a part of the destination file system that corresponds to a particular migrated source file system), then the reparenting operation can be performed by the destination file system.

In some reparenting examples, operation 918 comprises determining the migration identifier of the third components of a destination file handle based upon a corresponding destination inode number segment that that identifies a range of inode numbers that includes a destination inode number of the third components of a destination file handle, and wherein the range of inode numbers is unique among destination inode number segments of the destination file system. That is, instances of migration ID 540 of FIG. 5 can be compared, and where they are equal it can be determined that a reparenting occurs within a migration boundary. Where they are unequal, it can be determined that the reparenting occurs across a migration boundary.

In some examples, operation 918 comprises receiving, by the system, a request that indicates a file system operation to reparent an entity, and in response to determining that the reparenting is across a migration boundary of the source file system, returning, by the system, an error. That is, reparenting across a migration boundary can be implemented in a similar manner as described with respect to FIG. 6.

In some reparenting examples, determining that the reparenting is across the boundary of the migration comprises determining that a first migration number associated with a first inode in which the entity is located differs from a second migration number associated with a second inode in which the entity is to be reparented. That is, migration identifiers can be compared in a similar manner as described with respect to FIG. 6.

In some reparenting examples, in response to receiving the error, the client computer issues a request to the destination file system to copy the entity on the destination file system in response to receiving the error. That is, a destination computer can send a client computer an error for the reparenting operation, and the client computer can then issue requests to perform file system operations to copy the object on the destination file system.

In some examples, the source file system is a first source file system, and operation 918 comprises maintaining first migration information that comprises information on processing a rollback from the destination file system to the first source file system; maintaining second migration information that comprises information on processing a rollback from the destination file system to a second source file system; and using the second migration information to use a third source file handle originated on the second source file system with the destination file system. That is, rolling back a migration of a second file system can be performed in a similar manner as described with respect to FIG. 5. In such examples, the first migration information can be similar to migration info instance A 512A, and the second migration information can be similar to migration info instance B 512B.

In some examples, the first migration information comprises an identifier of the first file system, an identifier of the second file system, and a group of inode number segments that identify respective ranges of inode numbers of the second file system and respective inode number segments of the first file system. Using the example of FIG. 5, migration info instance A 512A and migration info instance B 512B can each store information as described with respect to FIG. 5.

In some examples, the respective ranges of inode numbers of the second file system respectively identify a unique range of inode numbers among the group of inode number segments. That is, it can be that each inode number segment within source inode number segment collection 418 of FIG. 4 identifies a unique range of inode numbers among inode number segments of source inode number segment collection 418. This unique range for each segment can be bounded by inode num lo 422 and inode num hi 424.

In some examples, operation 918 comprises, in response to determining to reparent a file system object across a migration boundary between a migration of the first source file system to the destination file system and a migration of a second source file system to the destination file system, returning to a client a different device error. That is, reparenting across a migration boundary can be processed in a similar manner as described with respect to FIG. 6.

After operation 918, process flow 900 moves to 920, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of client computer 102, source system 106A, and/or destination system 106B of FIG. 1; and/or client computer 202, source system 206A, source system 206B, and/or destination system 206C of FIG. 2;

In some examples, computing environment 1000 can implement one or more embodiments of the process flows of FIGS. 7-9 to facilitate efficient transparent rollback of file system consolidation migrations.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
performing a migration from a source file system on a first computer to a destination file system on a second computer, wherein performing the migration comprises re-assigning a network address from identifying the first computer to identifying the second computer;
in response to receiving a request, issued by a client computer, to perform a file system operation on the destination file system, wherein the request identifies a first source file handle:
directing, by the second computer and to the first computer, to perform the file system operation on the source file system with the first source file handle, to produce a second source file handle,
converting the first source file handle to corresponding first components of a destination file handle,
converting the second source file handle to corresponding second components of the destination file handle,
performing the file system operation on the destination file system with the first components of the destination file handle and the second components of the destination file handle, and responding to the client computer with the second source file handle; and in response to determining to roll back the migration, re-assigning the network address from identifying the second computer to identifying the first computer, wherein the client computer is configured to use the second source file handle that was issued by the second computer in accessing resources of the source file system.

2. The system of claim 1, wherein the source file system is a first source file system, wherein the file system operation is a first file system operation, wherein the destination file handle is a first destination file handle, and wherein the operations further comprise:

in response to receiving a second request to perform a second file system operation on the destination file system, wherein the request identifies a third source file handle, and wherein the third source file handle corresponds to a second source file system that has been migrated to the destination file system:

directing, by the second computer and to a third computer that hosts the second source file system, to perform the second file system operation on the second source file system with the third source file handle, to produce a fourth source file handle, converting the third source file handle to corresponding third components of a second destination file handle, converting the fourth source file handle to a corresponding fourth components of the second destination file handle, performing the second file system operation on the destination file system with the third components of the second destination file handle and the fourth components of the second destination file handle, and responding to the second request with the fourth source file handle; and wherein, after rolling back the migration, the fourth source file handle is configured for use in accessing resources of the second source file system.

3. The system of claim 1, wherein the source file system is a first source file system, wherein the client computer is a first client computer, wherein the destination file handle is a first destination file handle, and wherein the operations further comprise:

receiving a second request, from a reparenting client computer that comprises the first client computer or a second client computer, to perform a reparenting operation, wherein the second request identifies a third source file handle that indicates a current directory of an object being moved, a current name of the object being moved, a fourth source file handle that indicates a new directory to which the object is being moved, and a new name of the object after being moved;

converting the third source file handle into third components of second destination file handle;

converting the fourth source file handle into fourth components of the second destination file handle; and in response determining that the reparenting operation crosses a migration boundary where a migration identifier of the third components of the second destination file handle differs from a migration identifier of the fourth components of the second destination file handle, wherein the migration boundary indicates that the current directory corresponds to a first migration of the first source file system the new directory corresponds to a second migration of a second source file system, returning an error to the reparenting client computer, wherein the reparenting client computer processes the error by requesting copying of the object being moved on the destination file system.

4. The system of claim 3, wherein the operations further comprise:

in response to the reparenting operation being determined to occur within the migration boundary, performing the reparenting operation on the destination file system.

5. The system of claim 3, wherein the operations further comprise:

determining the migration identifier of the third components of the second destination file handle based upon a corresponding destination inode number segment that that identifies a range of inode numbers that includes a destination inode number of the third components of the second destination file handle, and wherein the range of inode numbers is unique among destination inode number segments of the destination file system.

6. The system of claim 1, wherein converting the first source file handle to the corresponding first components of the destination file handle comprises:

determining a destination inode number of the first components of the destination file handle based on performing a mathematical conversion on a source inode number of the first source file handle.

7. The system of claim 1, wherein converting the first source file handle to the corresponding first components of the destination file handle comprises:

setting a first generation number of the first source file handle to equal a second generation number of the first components of the destination file handle.

8. A method, comprising:

performing, by a system comprising a processor, a migration from a source file system on a first computer to a destination file system on a second computer, wherein performing the migration comprises re-assigning a network address from identifying the first computer to identifying the second computer;

in response to receiving, by the system, a request, issued by a client computer, to perform a file system operation on the destination file system, wherein the request identifies a first source file handle:

directing, by the second computer and to the first computer, to perform the file system operation on the source file system with the first source file handle, to produce a second source file handle, converting the first source file handle to corresponding first components of a destination file handle, converting the second source file handle to corresponding second components of the destination file handle, performing the file system operation on the destination file system with the first components of the destination file handle and the second components of the destination file handle, and responding to the client computer with the second source file handle; and in response to determining to roll back the migration, re-assigning, by the system, the network address from identifying the second computer to identifying the first computer, wherein the client computer is configured to use the second source file handle that was issued by the second computer in accessing resources of the source file system.

9. The method of claim 8, wherein the source file system is a first source file system, wherein the file system operation is a first file system operation, wherein the destination file handle is a first destination file handle, and further comprising:
- in response to receiving, by the system, a second request to perform a second file system operation on the destination file system, wherein the request identifies a third source file handle, and wherein the third source file handle corresponds to a second source file system that has been migrated to the destination file system:
  - directing, by the second computer and to a third computer that hosts the second source file system, to perform the second file system operation on the second source file system with the third source file handle, to produce a fourth source file handle,
  - converting the third source file handle to corresponding third components of a second destination file handle,
  - converting the fourth source file handle to a corresponding fourth components of the second destination file handle,
  - performing the second file system operation on the destination file system with the third components of the second destination file handle and the fourth components of the second destination file handle, and
  - responding to the second request with the fourth source file handle; and
- wherein, after rolling back the migration, the fourth source file handle is configured for use in accessing resources of the second source file system.

10. The method of claim 8, wherein the file system operation is a first file system operation, wherein the request is a first request, and further comprising:
- receiving, by the system, a second request that indicates a second file system operation to reparent an entity; and
- in response to determining that the reparenting is across a migration boundary of the source file system, returning, by the system, an error.

11. The method of claim 10, wherein determining that the reparenting is across the migration boundary comprises:
- determining, by the system, that a first migration number associated with a first inode in which the entity is located differs from a second migration number associated with a second inode in which the entity is to be reparented.

12. The method of claim 10, wherein, in response to receiving the error, the client computer issues a third request to the destination file system to copy the entity on the destination file system in response to receiving the error.

13. The method of claim 8, wherein the first components of the destination file handle comprise an identifier of the destination file system, a destination inode number, and a generation number.

14. The method of claim 13, wherein the identifier is a first identifier, and wherein the first source file handle comprises a second identifier of the source file system, a source inode number, and the generation number.

15. A non-transitory computer-readable medium comprising instructions that, in response to execution, cause a system comprising a processor to perform operations, comprising:
- performing a migration from a source file system on a first computer to a destination file system on a second computer, wherein performing the migration comprises re-assigning a network address from identifying the first computer to identifying the second computer;
- in response to receiving a request, issued by a client computer, to perform a file system operation on the destination file system, wherein the request identifies a first source file handle:
  - directing, by the second computer and to the first computer, to perform the file system operation on the source file system with the first source file handle, to produce a second source file handle,
  - converting the first source file handle to corresponding first components of a destination file handle,
  - converting the second source file handle to corresponding second components of the destination file handle,
  - performing the file system operation on the destination file system with the first components of the destination file handle and the second components of the destination file handle, and
  - responding to the client computer with the second source file handle; and
- in response to determining to roll back the migration, re-assigning the network address from identifying the second computer to identifying the first computer, wherein the client computer is configured to use the second source file handle that was issued by the second computer in accessing resources of the source file system.

16. The non-transitory computer-readable medium of claim 15, wherein the source file system is a first source file system, and wherein the operations further comprise:
- maintaining first migration information that comprises first information on processing a first rollback from the destination file system to the first source file system;
- maintaining second migration information that comprises second information on processing a second rollback from the destination file system to a second source file system; and
- using the second migration information to use a third source file handle originated on the second source file system with the destination file system.

17. The non-transitory computer-readable medium of claim 16, wherein the first migration information comprises a first identifier of the source file system, a second identifier of the destination file system, and a group of inode number segments that identify respective ranges of inode numbers of the destination file system and respective inode number segments of the source file system.

18. The non-transitory computer-readable medium of claim 17, wherein the respective ranges of inode numbers of the destination file system respectively identify a unique range of inode numbers among the group of inode number segments.

19. The non-transitory computer-readable medium of claim 15, wherein the source file system is a first source file system, wherein the migration is a first migration, and wherein the operations further comprise:
- in response to determining to reparent a file system object across a migration boundary between the first migration of the first source file system to the destination file system and a second migration of a second source file system to the destination file system, returning to a client a different device error.

20. The non-transitory computer-readable medium of claim 15, wherein the operations further comprise:
- determining a first inode number for the first components of the destination file handle based on subtracting an inode offset to a second inode number for the first source file handle, adding the inode offset to the second inode number, or bitwise shifting at least part of the second inode number.

* * * * *